March 18, 1952     W. E. GOULD     2,589,244
METER STOP
Filed May 9, 1945

Inventor:
Wallace E. Gould,
By Cushman, Darby Cushman
Attorneys

UNITED STATES PATENT OFFICE 2,589,244

METER STOP

Wallace E. Gould, Decatur, Ill., assignor to Mueller Co., Decatur, Ill., a corporation of Illinois Application May 9, 1945, Serial No. 592,845

4 Claims. (Cl. 251—93)

The present invention relates to meter stops and, more particularly, to meter stops for gas lines.

It is invariable practice to install a meter stop adjacent a gas meter in order that the supply of gas may be cut off when necessary. However, such stops are rarely operated except upon a change of occupancy, and, therefore, the plug may remain in one position for a number of years and become seized.

In order to enable the plug of a meter stop to be turned if it has been in the same position over a long period of time, and also to provide a thorough seal, it has been proposed to provide such stops with conventional means to lubricate the seating surface. However, the lubricant used under such circumstances is extremely heavy so that the film of lubricant in the seating surface becomes hard and, therefore, is of little assistance in making the plug freely rotatable. For that reason, it has been usual, even in the lubricated type of stops, to have the smaller end of the plug project from the casing in accordance with a long-followed practice. This permits an operator to strike the small end of the plug with a hammer so as to release the plug and enable it to be rotated.

Stops of the above type have also been provided with a spring within the lubricant chamber at the larger end of the plug for holding the plug against the casing seat. One purpose of this spring has been to reseat the plug after it has been unseated by a hammer blow.

A serious difficulty in a stop provided with a lubricant means including a lubricant chamber and provided with the usual spring at the larger end of the stop has resulted from the fact that the spring could fall from the stop. More particularly, the spring has been seated on a lubricant cap through which lubricant was placed in the lubricant chamber, the other end of the spring bearing on the larger end of the plug. The stop is usually mounted with the larger end downward. Therefore, when the cap was removed to permit additional lubricant to be inserted, the spring could fall from the stop. In some cases, the plug could also fall from the casing, resulting in a temporary but serious escape of gas and possible marring of the plug.

As has been stated above, the spring within the lubricant chamber has been sufficiently strong to hold the plug against the seat and to reseat the plug if the latter is unseated by a hammer blow. In this connection, it is to be noted that when the plug is struck, its unseating movement forces its larger end towards or into the lubricant chamber and this causes some of the grease in the chamber to be forced along the seating surface of the plug. Obviously, if the spring is strong enough to then reseat the plug, it must exert sufficient pressure upon the plug to return the grease from the seating surface to the lubricant chamber. I have found that in order to perform this function, the spring must be so strong that the plug is almost immovable. In other words, the spring maintains the plug seated with such force that only an extremely powerful blow can unseat the plug. In short, the plug is almost as tightly seated by the spring as though it were rigidly mounted. Rigidly mounted or seated plugs are objectionable in meter stops because the hammer blow necessary to unseat them may deform the rigidly mounted elements which hold them seated.

As has been stated above, in these prior structures, the spring was seated on a lubricant cap. One purpose of the lubricant cap was to permit greater pressure to be exerted upon the lubricant. However, inward threading of the lubricant cap for the purpose of increasing the pressure upon the lubricant also caused the spring to exert a stronger pressure upon the plug. In other words, at the same time that the lubricant cap was threaded inwardly with a view of forcing grease to the seating surface, the operator was simultaneously urging the plug to a tighter engagement with the casing seat.

An object of the present invention is to provide a meter stop which is so constructed that the plug will be held seated primarily by lubricant pressure and wherein movement of lubricant to the seating surface will not be prevented by any spring-seating action.

Another object of the invention is to provide a meter stop which includes means to prevent the plug from dropping from its seat when no lubricant pressure is applied thereto.

A further object of the invention is to provide a meter stop wherein the lubricant pressure can be increased without affecting the action of any resilient means to hold the plug seated.

A further object of the invention is to provide a meter stop which is of such construction that the plug can be readily unseized for rotation and without the possibility of distorting any important or expensive element of the stop.

Other objects and advantages of the invention will be apparent from the accompanying drawing, wherein.

Figure 1:
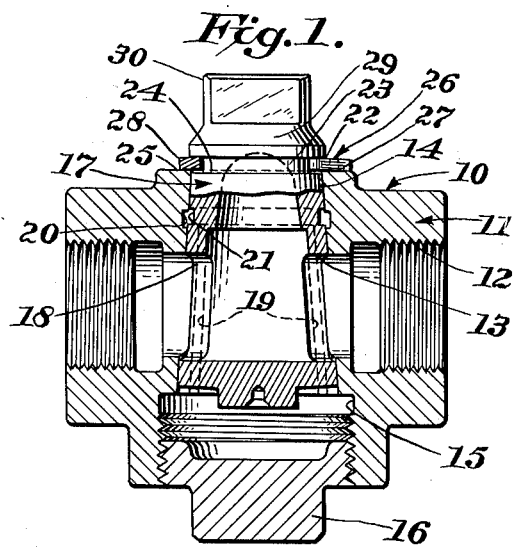
Figure 1 is an axial section through the stop with portions of the plug in elevation.
Figure 2:
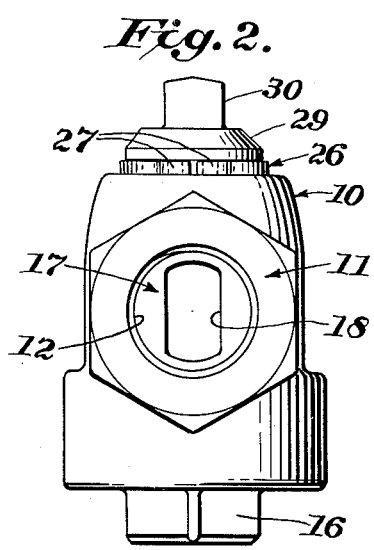
Figure 2 is an elevation of the stop viewed at 90° with respect to Figure 1.
Figure 3:
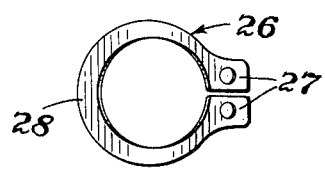
Figure 3 is a plan view of the securing means used in Figures 1 and 2.

Referring to Figures 1 to 3, the numeral 10 generally designates the stop of these figures which includes a casing 11 provided with a flow passageway 12. A tapered seat 13 extends transversely of the flow passageway 12, the smaller end 14 of this seat opening to the exterior of the casing 11 as best shown in Figure 1, while the larger end of the seat opens to a lubricant chamber 15. The lubricant chamber is threaded to receive a cap 16. A tapered plug 17 is provided in the seat 13, the plug being provided with a flow port 18 adapted to be aligned with the flow passageway 12 for flow of fluid through the stop.

The seat 13 of casing 11 is provided with any well-known type of lubricant groove system, for example, four longitudinal grooves 19 which extend from the lubricant chamber 15 to a circumferential groove 20 positioned above the flow passageway 12. The groove system also includes the circumferential groove 21 in the plug and opposed to the groove 20. It will be observed that the four longitudinal grooves 19 are equi-distantly spaced around the seating surface with two of these grooves on each side of the flow passageway 12. As a result, when the plug 17 is in closed position, a groove 19 will be between the edge of the plug flow port 18 and the adjacent edge of the flow passageway 12.

The groove system which has been described above enables grease to be moved to the seating surfaces at such points that the grease can be distributed over those surfaces to seal the stop in closed position. In addition, the circumferential grooves prevent leakage from the smaller end of the plug. However, any groove system which gives these results may be provided.

Plug 17 is provided at its smaller end with a circumferential groove or pocket 22 so positioned in the plug that the greater portion of the groove width will be outside of the casing 11 when the plug is seated. The opposite walls 23 and 24 of groove 22 are parallel and normal to the axis of the plug and are preferably also parallel to the flat surface 25 on the casing 11 surrounding the smaller end of the seat 14.

A split ring 26 shown in plan in Figure 3, is mounted in the groove 22 as best shown in Figures 1 and 2, the ring 26 including two ends 27 which are adjacent each other. In its normal condition, the ring 26 will be slightly arched in that while its ends 27 and the diametrically opposite bight portion 28 are bearing upon a flat surface, the intermediate portions will be arched above that surface, or up out of the plane of the drawing in Figure 3. This action is generally illustrated in Figure 1 although in that view the split ring 26 is about half compressed from the form it would have when free of the plug.

The plug 17 is also provided with an annular tapered or frusto-conical portion 29 inclined downwardly toward the groove 22. At its upper or smaller end, portion 29 has a diameter slightly less than the inside diameter of ring 26 and the operating shank 30 extends upwardly therefrom. The greatest dimension of shank 30 is such that ring 26 can be freely moved down around it and placed on the tapered portion 29. Then the ring can be forced down along the tapered portion until it contracts to fit the groove 22 as described in the application of Frederick Tratzik for Meter Stops, Serial No. 589,872, filed April 23, 1945, now abandoned.

When the ring 26 is seated in the groove 22, at least its ends 27 and diametrically opposite bight portion 28 will bear upon the flat surface 25 of the casing and will thereby serve to hold the plug in the seat 14. Apertures 31 may be provided in the ends 27 of the split ring to enable it to be spread apart, the ring being resilient to return to its Figure 5 form when such spreading action is released. The spring is also resilient toward maintaining the arched position described above.

When the ring 26 has been applied to the groove 22 as hereinbefore described, it will serve to hold the plug 17 within the casing. More specifically, when the stop 10 is connected in a flow line, the installer will remove the cap 16 and fill the chamber 15 with a lubricating grease, the ring or securing element serving to prevent the plug from falling out of the casing 11 during this operation. When the chamber 15 has been filled with grease, the installer will thread the cap inwardly until sufficient pressure has been applied to the grease in the chamber to cause grease to move into the groove system. The plug 17 may then be rotated to distribute grease from the grooves over the seating surface and the cap 16 can then be threaded somewhat further into chamber 15 to move additional grease into the groove system and establish adequate pressure upon the larger end of the plug to hold it seated. When grease is thus applied to the seating surface, the plug will move slightly toward the larger end of the seat, bending the securing means 26 to a less arched condition, such as indicated in Figure 1.

When it next becomes necessary to rotate the plug 17, usually after it has been in one position for some years, if the plug cannot be rotated by a tool applied to the shank 30, the operator will strike the shank with a hammer to move it downwardly in the seat and against the body of lubricant in the chamber 15. Because the ring 26 exerts no substantial degree of pressure to hold the plug seated, it will readily bend toward a more flattened condition to permit the plug to move away from the seat 14. The downward or inward movement of the plug will cause pressure to be exerted upon the lubricant in chamber 15 to drive additional lubricant into the groove system. The fact that the seat is thereby additionally lubricated, plus the fact that the plug is also freed, will enable the plug to be rotated. However, the plug will still be held toward the smaller end of the seat by the lubricant in chamber 15, and will be sealed by the lubricant in the groove system. If leakage occurs, the operator may rotate the cap 16 to apply a greater seating pressure to the plug. The only effect of such rotation on securing means 26 will be to cause it to become slightly more arched.

It is usually found that when a plug has been in one position for some years, the supply of lubricant has become reduced by seepage into the flow line. To correct for this, and to prevent leakage when the plug is unseated, the operator will usually check the cap 16 to determine whether it can be threaded further inwardly before the plug is struck, as described above. Otherwise, the hammer blow might drive the plug too far away from its seat. Such a condition would be indicated by the arched condition of ring 26. In any event, after the operator has released and rotated the plug, he will check the supply of lubricant in the chamber 15 and if additional lubricant is required, it can be inserted. Throughout all of these operations upon the plug requiring removal of cap 16, the ring 26 will hold the plug securely within the casing. It is to be noted that the thick grease used in meter stops has a marked adhesive action even when it is not under pressure. This fact, coupled with the engaging action of the ring upon the plug, will prevent the plug from leaking or becoming free of the lubricant in the seating surface either because of its own weight or by line pressure, if the plug is open to line pressure when cap 16 is removed. In any event, as has been stated above, the ring will serve as a securing means to prevent the plug from falling entirely out of the casing element when the cap 16 is removed. The principal result and purpose of its tendency to arch is to hold the plug firmly against the seat when lubricant pressure is entirely relieved, as when the cap 16 is removed from the casing for the insertion of grease or for inspection of the lubricant chamber.

Figure 4:
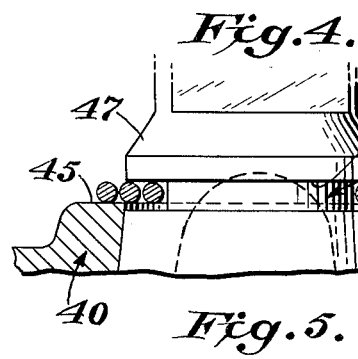
Figure 4 is a fragmentary and enlarged view of a valve with portions in axial section and showing a modified form of securing means.
Figure 5:
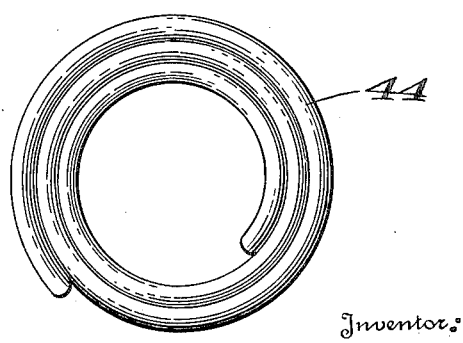
Figure 5 is a plan view of the securing means used in Figure 4.

Referring to Figures 4 and 5, the stop 40 illustrated in Figure 4 includes a plug 41 which is identical with that of Figures 1 and 2 except that the groove 42 has a slightly greater depth radially of the plug than the groove 22. In addition, the securing element 44 of Figures 4 and 5 comprises a helical spring. In its normal condition, the element 44 expands so that all of its coils do not lie in the same plane but the spring becomes helical. However, when the element 44 is applied to the stop as shown in Figure 4, all of its coils will lie in substantially the same plane with at least the outer coil bearing upon the flat surface 45 of the casing while the inner and smaller coil will act upwardly on the top surface 46 of groove 42.

The helical coil securing element 44 has sufficient resiliency that its smaller coils can be expanded by downward movement along the frusto-conical surface 47 of the plug and the device thereby placed in the groove 42.

The element 44 will also urge the plug 41 to its seat but, just as is the case with the structure of Figures 1 to 3, this resilient securing element will not exert a force comparable to that of the pressure exerted by the grease, otherwise the plug could not be readily unseized by a hammer blow. Instead, the resiliency of the element 44 is only sufficient that the plug will be held in proper position when all pressure upon the grease is removed, as is the case when the lubricant cap of the valve is threaded well outwardly or is entirely removed. The action of the securing element 44 under these conditions, coupled with the adhesive effect of whatever grease may be on the seating surface, will prevent the valve from leaking when the cap is removed or unthreaded so far that the grease is not under pressure.

Figure 6:
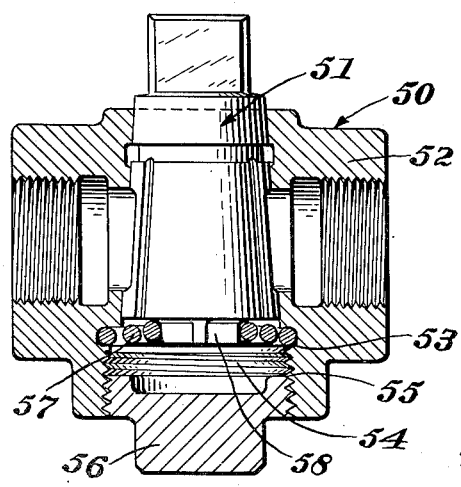
Figure 6 is an axial section through a second modified form of the stop, with portions of the plug in elevation.

Referring to Figure 6, the stop 50 therein is provided with a tapered plug 51 which is identical with that disclosed in Figure 1 except that it includes no groove such as the groove 22 of Figure 1, nor does it include a frusto-conical surface such as 26 of Figure 1. The casing 52 of Figure 6 is identical with the casing illustrated in Figure 1 except that an annular pocket 53 is formed in the lubricant chamber 54 above the threads 55 which are engaged by the lubricant cap 56. A helical spring 57 is positioned in the groove 53, the outermost coil of the spring being fitted in the groove 53, while its innermost coil surrounds the usual square or circular boss 58 provided at the larger end of a plug such as 51. Spring 57 is sufficiently resilient that it can be contracted to thread into the groove 53 along the threads 55. When it is free of the valve, it will have a more markedly helical form than illustrated in Figure 6 and, therefore, may be regarded as a normally arched element.

The purpose of the spring 57 is the same as that of the other forms of securing means illustrated in Figures 1 to 5 in that the spring 57 has sufficient resiliency to hold the plug in place when the lubricant cap 56 is removed. However, as is the case with the previously described securing elements, spring 57 will not exert a seating action comparable to that of the grease pressure which can be built up by inward threading of cap 56. Therefore, under normal circumstances, grease pressure will be relied upon to hold the plug seated. The element 57 will permit the plug to be unseated by a hammer blow. That is, like the previously described securing elements, it will enable the hammer blow to readily unseat the plug so that the principal purpose of that blow will be obtained, i. e., a movement of grease from the lubricant chamber to the seating surface. As has been heretofore pointed out, prior resilient means have been intended to reseat the plug and therefore had to be so strong as to defeat the principal purpose of the hammer blow.

It will be observed that the securing element 57 does not bear upon the lubricant cap 56. Therefore, removal of the cap will not result in removal of the spring 57 nor does any threading action of the cap in either direction cause the tension of the spring 57 to be varied.

The terminology used in the specification is for the purpose of description and not of limitation, the scope of the invention being indicated in the claims.

I claim:

1. In combination, a casing including a flow line and a tapered seat extending transversely of the flow line, a tapered plug rotatable in the seat, a lubricant chamber at the larger end of the casing seat and open to the larger end of the plug, means associated with said chamber to create pressure on lubricant therein to move the plug toward the seat and hold it seated, the smaller end of the seat being open to the exterior of the casing, the smaller end of the plug projecting out of the smaller end of the seat to be accessible for unseating pressure, the portion of the smaller end of the plug which extends to the exterior of the casing being of a diameter corresponding to that of the smaller end of the casing seat, the plug having a circumferential groove in its smaller end and opposite the smaller end of the casing seat, and a normally arched spring element having one portion thereof bearing on the outer surface of the groove and another portion thereof bearing on the adjacent portion of the casing.

2. In combination, a casing including a flow line and a tapered seat extending transversely of the flow line, a tapered plug rotatable in the seat, a lubricant chamber at the larger end of the casing seat and open to the larger end of the plug, means associated with said chamber to create pressure on lubricant therein to move the plug toward the seat and hold it seated, the smaller end of the seat being open to the exterior of the casing, the smaller end of the plug projecting out of the smaller end of the seat to be accessible for unseating pressure, the portion of the smaller end of the plug which extends to the exterior of the casing being of a diameter corresponding to that of the smaller end of the casing seat, the plug having a circumferential groove in its smaller end and opposite the smaller end of the casing seat, and a normally arched spring split ring having one portion thereof bearing on the outer surface of the groove and another portion thereof bearing on the adjacent portion of the casing.

3. In combination, a casing including a flow line and a tapered seat extending transversely of the flow line, a tapered plug rotatable in the seat, a lubricant chamber at the larger end of the casing seat and open to the larger end of the plug, means associated with said chamber to create pressure upon lubricant therein to move the plug toward the seat and hold it seated, the smaller end of the seat being open to the exterior of the casing, the smaller end of the plug projecting out of the smaller end of the seat to be accessible for sealing pressure, said projecting portion of the plug including an operating shank at the extreme outer end thereof, a tapered portion inwardly of said shank and of a diameter which increases toward the casing and a circumferential groove inwardly of said tapered portion, and a resilient element having one portion thereof extending within said groove and another portion thereof bearing on the adjacent portion of the casing, said resilient element being radially expandable by inward movement along said tapered portion of the projecting portion of the plug.

4. The combination described in claim 1 wherein said spring element is of helical form.

WALLACE E. GOULD.

REFERENCES CITED

The following references are of record in the file of this patent:

UNITED STATES PATENTS

| Number | Name | Date |
| --- | --- | --- |
| 491,469 | Carver | Feb. 7, 1893 |
| 1,650,573 | Searles | Nov. 22, 1927 |
| 1,898,577 | Ford | Feb. 21, 1933 |
| 2,122,721 | Nordstrom | July 5, 1938 |